US012537646B2

(12) United States Patent
Echigo et al.

(10) Patent No.: US 12,537,646 B2
(45) Date of Patent: Jan. 27, 2026

(54) RADIO BASE STATION AND TERMINAL

(71) Applicant: NTT DOCOMO, INC., Tokyo (JP)

(72) Inventors: Haruhi Echigo, Tokyo (JP); Daisuke Kurita, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 310 days.

(21) Appl. No.: 18/260,676

(22) PCT Filed: Jan. 8, 2021

(86) PCT No.: PCT/JP2021/000527
§ 371 (c)(1),
(2) Date: Jul. 7, 2023

(87) PCT Pub. No.: WO2022/149268
PCT Pub. Date: Jul. 14, 2022

(65) Prior Publication Data
US 2024/0063972 A1 Feb. 22, 2024

(51) Int. Cl.
H04L 5/00 (2006.01)
H04W 72/0446 (2023.01)

(52) U.S. Cl.
CPC ....... *H04L 5/0051* (2013.01); *H04W 72/0446* (2013.01)

(58) Field of Classification Search
None
See application file for complete search history.

(56) References Cited

U.S. PATENT DOCUMENTS

| 2019/0223186 | A1  | 7/2019  | Liu et al. |
| 2020/0146035 | A1  | 5/2020  | Kim et al. |
| 2021/0314952 | A1* | 10/2021 | Taherzadeh Boroujeni ................ H04W 72/53 |
| 2022/0104227 | A1* | 3/2022  | Sridharan ......... H04W 72/1268 |
| 2023/0048695 | A1* | 2/2023  | Kim ....................... H04L 5/0082 |
| 2023/0216711 | A1* | 7/2023  | Yao ........................ H04L 5/0051 370/328 |
| 2023/0291523 | A1* | 9/2023  | Hasegawa ............. H04L 5/0094 |

FOREIGN PATENT DOCUMENTS

| JP | 2019-526971 A | 9/2019 |
| WO | 2019022456 A2 | 1/2019 |

OTHER PUBLICATIONS

Office Action issued in Japanese Application No. 2022-573882, mailed Feb. 4, 2025 (6 pages).
Office Action issued in Japanese Patent Application No. 2022-573882, dated May 22, 2025 (6 pages).
China Telecom; "New SID on NR coverage enhancement"; 3GPP TSG RAN Meeting #86, RP-193240; Sitges, Spain; Dec. 9-12, 2019 (4 pages).
International Search Report issued in PCT/JP2021/000527 on Aug. 17, 2021 (8 pages).

(Continued)

*Primary Examiner* — Derrick W Ferris
(74) *Attorney, Agent, or Firm* — Osha Bergman Watanabe & Burton LLP

(57) ABSTRACT

A radio base station receives the uplink channel and performs channel estimation of the uplink channel allocated across the plurality of slots by using the demodulation reference signal allocated to the plurality of consecutive slots.

5 Claims, 13 Drawing Sheets

(56) References Cited

OTHER PUBLICATIONS

Written Opinion of the International Searching Authority issued in PCT/JP2021/000527 on Aug. 17, 2021 (4 pages).
Qualcomm Incorporated; "Potential techniques for coverage enhancements"; 3GPP TSG-RAN WG1 Meeting #101, R1-2004499; e-Meeting, May 25-Jun. 5, 2020 (15 pages).
CATT; "Discussion on potential techniques for PUSCH coverage enhancement"; 3GPP TSG RAN WG1 #102, R1-2005724; e-Meeting, Aug. 17-28, 2020 (4 pages).

* cited by examiner

USAGE EXAMPLE OF DM-RS bundling OF PUCCH format 3

RADIO BASE STATION AND TERMINAL

TECHNICAL FIELD

The present disclosure relates to a radio base station and a terminal that support coverage enhancement.

BACKGROUND ART

3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

For example, 3 GPP Release-17 agreed to consider coverage enhancement (CE) in NR (Non-Patent Literature 1).

CITATION LIST

Non-Patent Literature

Non-Patent Literature 1 "New SID on NR coverage enhancement", RP-193240, 3 GPP TSG RAN Meeting #86, 3 GPP, December 2019

SUMMARY OF INVENTION

DDDSU (D: Downlink (DL) symbol, S: DL/Uplink (UL) or Guard symbol, U: UL symbol) is specified as the slot configuration pattern of time-division duplex (TDD), and when the S-slot is 10 D+2 G+2 U, 2 symbols (2 U) and 1 slot (14 symbols) continuous in the time direction can be used for UL, that is, a plurality of consecutive slots can be used for UL.

However, even in such a case, channel estimation across a plurality of slots is not assumed, and channel estimation of PUSCH (Physical Uplink Shared Channel) is executed using the demodulation reference signal (DMRS) for each slot. That is, radio resources are not always utilized effectively, and there is room for improvement, especially from the viewpoint of improving coverage performance.

Accordingly, the following disclosure has been made in view of such a situation, and it is an object of the present invention to provide a radio base station and a terminal capable of more efficiently utilizing radio resources related to uplink channels such as PUSCH.

One aspect of the present disclosure is a radio base station (gNB 100) including a reception unit (radio signal transmission and reception unit 110) that receives an uplink channel, and a control unit (control unit 170) that performs channel estimation of the uplink channel allocated across the plurality of slots by using a demodulation reference signal allocated to each of the plurality of consecutive slots.

One aspect of the present disclosure is a terminal (UE 200) including a control unit (control unit 170) that controls transmission of a demodulation reference signal allocated to a plurality of consecutive slots, and a transmission unit (control signal and reference signal processing unit 140) that transmits capability information related to channel estimation of an uplink channel using the demodulation reference signal.

MODES FOR CARRYING OUT THE INVENTION

Figure 1:
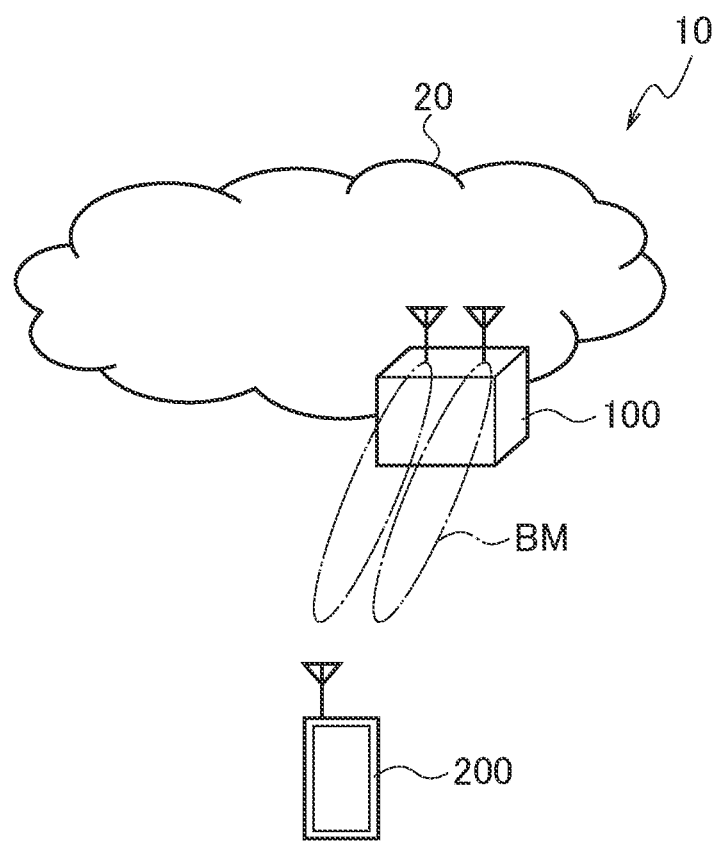
FIG. 1 is an overall schematic configuration diagram of radio communication system 10.

Exemplary embodiments of the present invention are explained below with reference to the accompanying drawings. Note that, the same or similar reference numerals have been attached to the same functions and configurations, and the description thereof is appropriately omitted.

(1) OVERALL SCHEMATIC CONFIGURATION OF THE RADIO COMMUNICATION SYSTEM

FIG. 1 is an overall schematic configuration diagram of a radio communication system 10 according to this embodiment. radio communication system 10 is a 5 G New Radio (NR) compliant radio communication system and includes a Next Generation-Radio Access Network 20 (User Equipment 200, hereinafter UE 200), NG-RAN 20, and terminal 200.

The radio communication system 10 may be a radio communication system that follows a scheme called Beyond 5G, 5G Evolution or 6 G.

The NG-RAN 20 includes a radio base station 100 (hereinafter, gNB 100). The specific configuration of radio communication system 10 including the number of gNBs and UEs is not limited to the example shown in FIG. 1.

The NG-RAN 20 actually includes a plurality of NG-RAN Nodes, specifically gNBs (or ng-eNBs), and is connected to a core network (5GC, not shown) according to 5G. The NG-RAN 20 and 5 GC may be expressed simply as a "network".

The gNB 100 is a radio base station according to NR, and executes radio communication according to the UE 200 and NR. By controlling radio signals transmitted from a plurality of antenna elements, the gNB 100 and the UE 200 can support Massive MIMO that generates a beam with higher directivity, carrier aggregation (CA) that uses a plurality of component carriers (CCs) bundled together, and dual connectivity (DC) that simultaneously communicates between the UE and each of a plurality of NG-RAN nodes.

The radio communication system 10 corresponds to FR 1 and FR 2. The frequency bands of each FR (Frequency Range) are as follows.

FR 1: 410 MHz to 7.125 GHz
FR 2: 24.25 GHz to 52.6 GHz

In FR 1, 15, 30 or 60 kHz Sub-Carrier Spacing (SCS) may be used and a 5~100 MHz bandwidth (BW) may be used. FR 2 is a higher frequency than FR 1, and an SCS of 60 or 120 kHz (240 kHz may be included) may be used, and a bandwidth (BW) of 50~400 MHz may be used.

Furthermore, radio communication system 10 may correspond to a higher frequency band than the frequency band of the FR 2. Specifically, radio communication system 10 may cover a frequency band greater than 52.6 GHz and up to 114.25 GHz.

Cyclic Prefix-Orthogonal Frequency Division Multiplexing (CP-OFDM)/Discrete Fourier Transform-Spread (DFT-S-OFDM) with larger sub-carrier spacing (SCS) may also be applied. Further, DFT-S-OFDM may be applied not only to the uplink (UL) but also to the downlink (DL).

Figure 2:
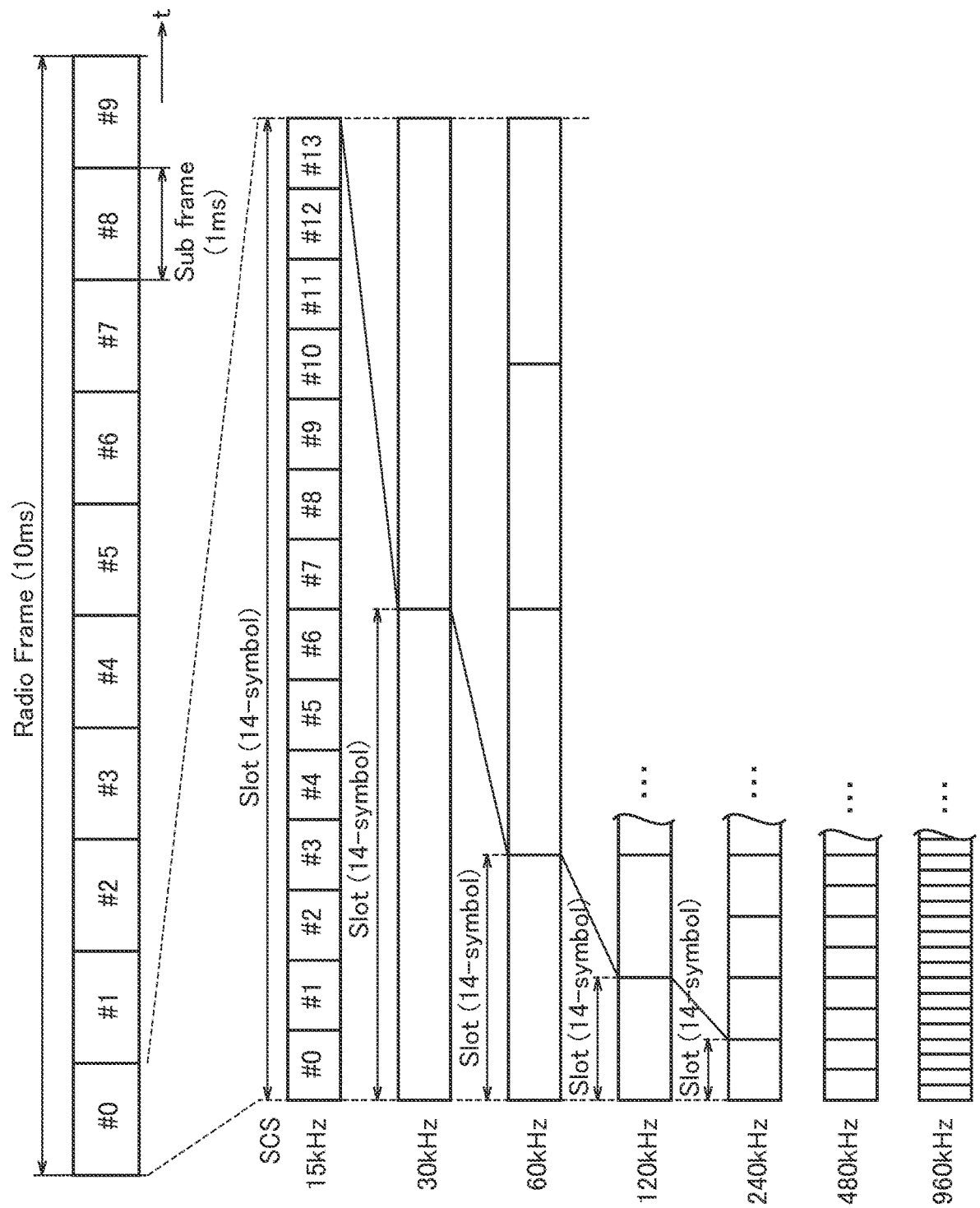
FIG. 2 is a diagram showing a configuration example of a radio frame, a sub-frame and a slot used in radio communication system 10.

FIG. 2 shows a configuration example of a radio frame, a sub-frame and a slot used in radio communication system 10.

As shown in FIG. 2, one slot comprises 14 symbols, and the larger (wider) the SCS, the shorter the symbol period (and the slot period). The number of symbols constituting 1 slot is not necessarily 14 (For example, 28, 56 symbols). The number of slots per subframe may vary depending on the SCS. In addition, the SCS may be wider than 240 kHz (For example, as shown in FIG. 2, 480 kHz, 960 kHz).

The time direction (t) shown in FIG. 2 may be referred to as a time domain, a symbol period or a symbol time. The frequency direction may also be referred to as a frequency domain, a resource block, a subcarrier, a Bandwidth part (BWP), or the like.

The radio communication system 10 can support a coverage enhancement (CE) that expands the coverage of the cells (or physical channels) formed by the gNB 100. Coverage enhancement may provide a mechanism for increasing the receive success rate of various physical channels.

For example, the gNB 100 can support repeated transmission of PDSCH (Physical Downlink Shared Channel), and the UE 200 can support repeated transmission of PUSCH (Physical Uplink Shared Channel).

In radio communication system 10, a slot configuration pattern of time division duplex (TDD) may be configured. For example, DDDSU (D: Downlink (DL) symbol, S: DL/Uplink (UL) or Guard symbol, U: UL symbol) may be specified (see 3 GPP TS 38.101-4).

"D" indicates a slot containing all DL symbols, and "S" indicates a slot containing a mixture of DL, UL, and guard symbols (G). "U" indicates a slot containing all UL symbols.

In radio communication system 10, the channel estimation of PUSCH (or PUCCH (Physical Uplink Control Channel) can be performed by using the demodulation reference signal (DMRS) for each slot, and the channel estimation of PUSCH (or PUCCH) can be performed by using the DMRS allocated to each of the plurality of slots.

(2) FUNCTION BLOCK CONFIGURATION OF RADIO COMMUNICATION SYSTEM

Figure 3:
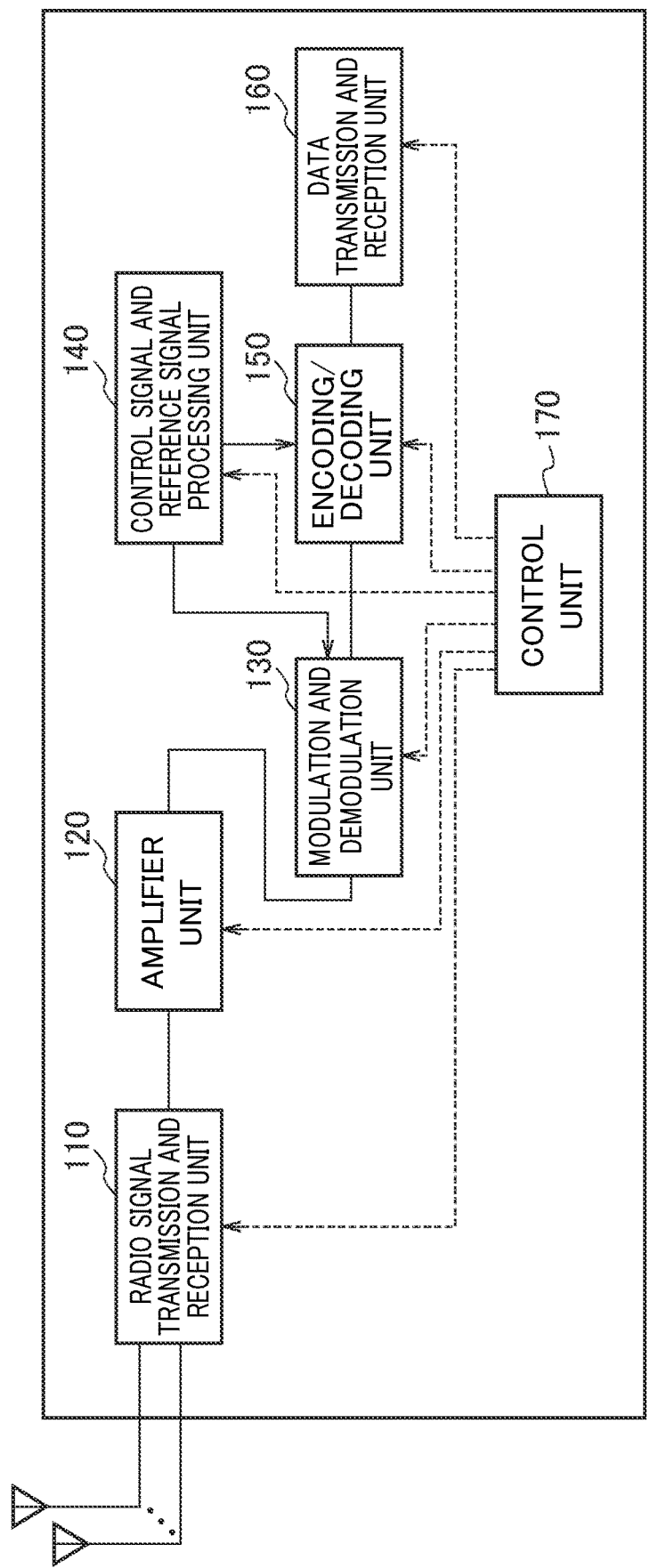
FIG. 3 is a functional block diagram of the gNB 100 and the UE 200.

Next, the functional block configuration of radio communication system 10 will be described. Specifically, the functional block configuration of the gNB 100 will be described. FIG. 3 is a functional block diagram of the gNB 100 and the UE 200.

As shown in FIG. 3, gNB 100 includes a radio signal transmission and reception unit 110, an amplifier unit 120, a modulation and demodulation unit 130, a control signal and reference signal processing unit 140, an encoding/decoding unit 150, a data transmission and reception unit 160 and a control unit 170.

Note that FIG. 3 shows only the main functional blocks related to the description of the embodiment, and the gNB 100 (UE 200) has other functional blocks (For example, the power supply section, etc.). FIG. 3 shows a functional block configuration of the gNB 100, and refer to FIG. 17 for a hardware configuration.

The radio signal transmission and reception unit 110 transmits and receives radio signals in accordance with NR. By controlling radio (RF) signals transmitted from multiple antenna elements, radio signal transmission and reception unit 110 can support Massive MIMO for generating more directional beams, Carrier Aggregation (CA) for bundling multiple component carriers (CCs), and Dual Connectivity (DC) for simultaneously communicating between the UE and each of the two NG-RAN Nodes.

The radio signal transmission and reception unit 110 may also receive a plurality of types of uplink channels. In this embodiment, radio signal transmission and reception unit 110 may constitute a reception unit.

The uplink channel may be interpreted as a physical channel. Specifically, the uplink channel may include PUSCH and PUCCH.

The amplifier unit 120 is composed of a PA (Power Amplifier)/LNA (Low Noise Amplifier) and the like. The amplifier unit 120 amplifies the signal output from the modulation and demodulation unit 130 to a predetermined power level. The amplifier unit 120 also amplifies the RF signal output from the radio signal transmission and reception unit 110.

The modulation and demodulation unit 130 performs data modulation/demodulation, transmission power setting, resource block allocation and the like for each specific communication destination (UE 200).

The control signal and reference signal processing unit 140 executes processing relating to various control signals transmitted and received by the gNB 100. Specifically, the control signal and reference signal processing unit 140 receives various control signals transmitted from the UE 200 via the control channel, for example, a control signal of the radio resource control layer (RRC). The control signal and reference signal processing unit 140 transmits various control signals to the UE 200 via the control channel.

In addition, the control signal and reference signal processing unit 140 may perform processing using a reference signal (RS), such as a Demodulation Reference Signal (DMRS) and a Phase Tracking Reference Signal (PTRS).

The DMRS is a reference signal (pilot signal) known between a base station and a terminal of each terminal for estimating a fading channel used for data demodulation. The PTRS is a reference signal for each terminal for the purpose of estimating phase noise which becomes a problem in a high frequency band.

In addition to the DMRS and PTRS, the reference signal may include a Channel State Information-Reference Signal (CSI-RS), a Sounding Reference Signal (SRS), and a Positioning Reference Signal (PRS) for position information.

The channel includes a control channel and a data channel. The control channels include PDCCH (Physical Downlink Control Channel), PUCCH (Physical Uplink Control Channel), PRACH (Physical Random Access Channel), PBCH (Physical Broadcast Channel), and the like.

The data channels include PDSCH (Physical Downlink Shared Channel) and PUSCH (Physical Uplink Shared Channel). The signals may include channel and reference signals.

The control signal and reference signal processing unit 140 may also transmit slot information indicating a slot to be subjected to channel estimation to the UE 200. In this embodiment, control signal and reference signal processing unit 140 may constitute a transmission unit.

Specifically, the control signal and reference signal processing unit 140 may send slot information to the UE 200 indicating the uplink channel, specifically the slot that is the subject of channel estimation using the PUSCH or PUCCH DMRS.

The slot information may be notified to the UE 200 by signaling of the higher layer (For example, RRC) or by downlink control information (DCI). Specific examples of slot information will be described later.

The encoding/decoding unit 150 performs data division/concatenation, channel coding/decoding, and the like for each specific communication destination (UE 200).

Specifically, encoding/decoding unit 150 divides the data output from the data transmission and reception unit 160 into predetermined sizes, and executes channel coding on the divided data. The encoding/decoding unit 150 decodes the data output from the modulation and demodulation unit 130 and connects the decoded data.

The data transmission and reception unit 160 sends and receives protocol data units (PDU) and service data units (SDU). Specifically, data transmission and reception unit 160 performs assembly/disassembly of PDUs/SDUs in a plurality of layers (Media access control layer (MAC), radio link control layer (RLC), and packet data convergence protocol layer (PDCP), etc.).

The control unit 170 controls each functional block constituting the gNB 100. In particular, in this embodiment, the control unit 170 executes control concerning channel estimation of the uplink channel using the DMRS.

Specifically, the control unit 170 can perform channel estimation of the uplink channels allocated across the plurality of slots by using the DMRS allocated to the plurality of consecutive slots, respectively.

A plurality of contiguous slots may be interpreted as two or more slots that are adjacent in time, or a plurality of slots that are not necessarily adjacent in time but are included within a predetermined time (For example, subframes). The plurality of slots may be replaced with symbols or subframes.

More specifically, the control unit 170 performs channel estimation of PUSCHs assigned across a plurality of slots.

The control unit 170 may perform channel estimation of the PUSCH allocated across the slots by repeating the Physical Uplink Shared Channel, PUSCH. Specifically, the control unit 170 can perform channel estimation of the PUSCH allocated across the plurality of consecutive slots by using the DMRS allocated to the plurality of slots, respectively.

The PUSCH may be allocated across two slots or over three or more slots.

Also, the control unit 170 may assume that only the DMRS is transmitted in the symbol included in the first slot among the plurality of slots described above. Specifically, it may be assumed that only the DMRS is transmitted in the S slot of the DDDSU.

More specifically, it may be assumed that only the DMRS is transmitted for the UL symbol (after the guard symbol) contained in the S slot.

The UE 200 may also be provided with the functions related to transmission/reception and control of the DMRS. For example, the UE 200 may include a control unit 170 for controlling transmission of DMRS allocated to a plurality of contiguous slots, and a control signal and reference signal processing unit 140 (transmission unit) for transmitting UE Capability Information regarding channel estimation of uplink channels using the DMRS.

(3) OPERATION OF RADIO COMMUNICATION SYSTEM

Next, the operation of radio communication system 10 will be described. Specifically, an operation related to channel estimation of an uplink channel for the purpose of coverage performance will be described.

(3.1) Assumptions

Figure 4:
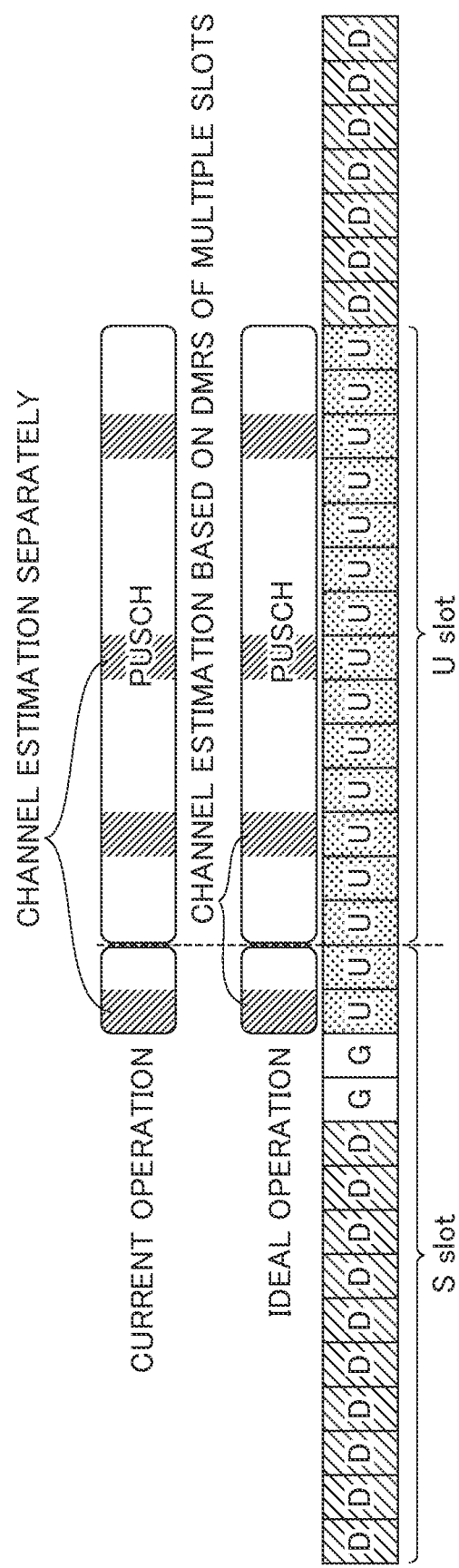
FIG. 4 is a diagram showing an example of allocation of DMRS and PUSCH according to the slot setting pattern of TDD.

FIG. 4 shows an example of allocation of DMRS and PUSCH according to the slot setting pattern of TDD. As described above, in the case of DDDSU (S: 10 D+2 G+2 U) which is a kind of slot setting pattern of TDD, 2 symbols (2 U) and 1 slot (14 symbols) which are continuous in the time direction can be used for UL, that is, a plurality of consecutive slots can be used for UL.

However, according to the current 3GPP specifications, channel estimation across slots is not assumed, and channel estimation of PUSCH is executed by using a separate DMRS for each slot (see "Current Operation" in the figure).

In the case of a setting pattern such as the DDDSU (S: 10 D+2 G+2 U) shown in FIG. 4, it is considered ideal to perform channel estimation using DMRS allocated to a plurality of slots, specifically, S slots and U slots, respectively (see "Ideal Operation" in FIG. 4). Such channel estimation may be referred to as the UL cross-slot channel estimation.

In other words, the current 3GPP specifications do not necessarily make effective use of radio resources, and there is room for improvement, especially from the viewpoint of improving coverage performance.

Therefore, it is believed that by increasing the channel estimation accuracy while utilizing the UL symbols in such continuous slots, more efficient utilization of the radio resources related to uplink channels such as PUSCH can be realized.

(3.2) Operation Overview

An operation example of improving the performance of coverage enhancement by Uplink cross-slot channel estimation will be described below.

Specifically, the operation example 1~4 will be described.
(Operation Example 1): PUSCH cross channel estimation (channel estimation using DMRS across slots)
  Multi-slot PUSCH-to-PUSCH DMRS bundling
    Cross channel estimation of multiple PUSCHs allocated during Multi-PUSCH allocation
    Cross channel estimation in multiple PUSCH repetitions assigned during PUSCH repetition
    Indicate the slot to which the cross-slot channel estimation applies
    DMRS deployment when applying DMRS bundling
(Operation Example 2): Sending DMRS only in a specific slot
  DMRS at 1 comb
  DMRS Ports with 1comb Example
  DMRS Insert Notification
(Operation Example 3): PUCCH cross channel estimation (channel estimation using DMRS across slots)
(Operation Example 4): UE capability notification
In the comb structure, the DMRS is transmitted for every N-th subcarrier, and N can take a value of, for example, 2 (comb2 structure).

(3.3) Example of Operation

The operation example 1~4 described above will now be described in detail.

(3.3.1) Operation Example 1

In this operation example, channel estimation of PUSCH is executed using DMRS across slots (PUSCH Cross-slot channel estimation).

Specifically, channel estimation may be performed using DMRS arranged in a plurality of slots according to any of the following options (Opt).
  (Opt 1): The UE 200 transmits so that the DMRS of the PUSCH arranged in the plurality of slots can be estimated in the plurality of slots.
    (Opt1A)—When allocating radio resources (time resources), DMRS bundling is enabled or disabled. Apply cross channel estimation to multiple PUSCHs allocated during multi-PUSCH allocation, and/or Apply cross channel estimation to multiple PUSCH repetitions assigned during PUSCH repetition
    (Opt1B)—DMRS bundling is enabled or disabled based on the slot to which the PUSCH is assigned.
The UE 200 may send a DMRS so that cross-slot channel estimation corresponding to any or more of the above options can be performed.
  (Opt2): Place the DMRS of the same antenna port as the PUSCH transmitted in the slot next to the UL symbol in the S slot.

Figure 5:
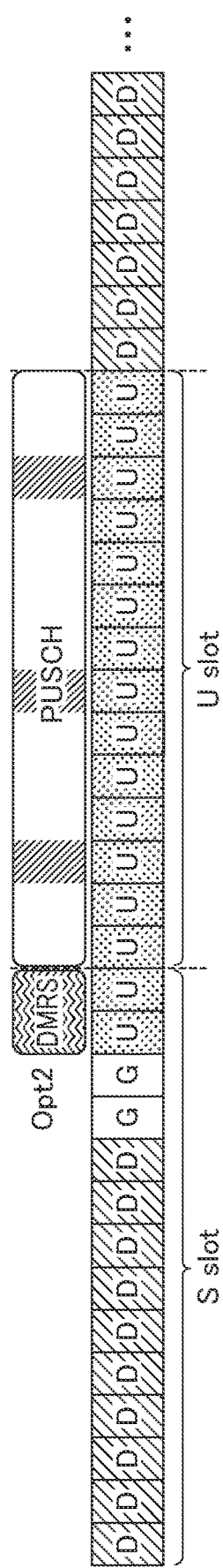
FIG. 5 is a diagram showing an example of allocation of DMRS and PUSCH according to operation example 1 (Opt2).

FIG. 5 shows an example of allocation of DMRS and PUSCH according to operation example 1 (Opt2). As shown in FIG. 5, channel estimation of the PUSCH may be performed using the DMRS allocated to a plurality of slots (two slots). The shaded portion on the PUSCH may be interpreted as a radio resource (time resources, may be symbols) to which the DMRS is assigned (hereinafter the same).

Figure 6:
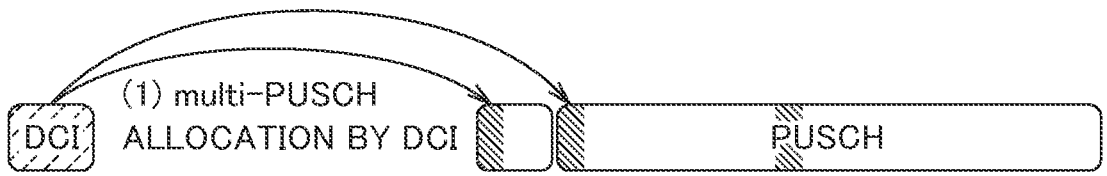
FIG. 6 is a conceptual diagram of the DMRS bundling between the PUSCHs of the plurality of slots according to the operation example 1.

FIG. 6 is a conceptual diagram of the DMRS bundling between the PUSCHs of the plurality of slots according to the operation example 1. As shown in FIG. 6, the cross channel estimation may be applied to a plurality of PUSCHs allocated during multi-PUSCH allocation.

Multi-PUSCH allocation allows multiple PUSCH resources to be allocated by a single DCI. In this case, the UE 200 may be instructed to transmit the DMRS so that channel estimation can be performed using the DMRS allocated to the plurality of slots.

The network (gNB 100) may notify the UE 200 of at least any of the following information.
  (i) Whether to apply DMRS bundling between allocated PUSCH resources
  (ii) Number of PUSCH resources to which DMRS bundling applies
  (iii) Maximum number of symbols to which DMRS bundling applies
  (iv) Maximum number of slots to which DMRS bundling applies Such notification may also be implemented by DCI or higher layer (For example, RRC) signaling.

In the case of DCI, the UE 200 may be notified of the above information, for example, DMRS bundling is applied between PUSCHs to which radio resources are allocated at the time of multi-PUSCH allocation.

Alternatively, it may be notified whether DMRS bundling is applied for multiple PUSCHs allocated by several row indices in the Time Domain Resource Allocation (TDRA) of the DCI. In this case, the above-described information may be configured or notified for each row index in advance by the specification of the 3GPP or by the signaling of the higher layer.

In the case of higher layer signaling, the UE 200 may be notified of the above information, such as that DMRS bundling is applied between PUSCHs to which radio resources are allocated during multi-PUSCH allocation.

For example, a parameter indicating whether or not DMRS bundling is applicable may be added to the PUSCH-TimeDomainResourceAllocation of the PUSCH-TimeDomainResourceAllocationList IE of the RRC layer. In this case, the above-described information may be configured or notified in advance by the specification of the 3GPP or by the signaling of the higher layer.

Figure 7:
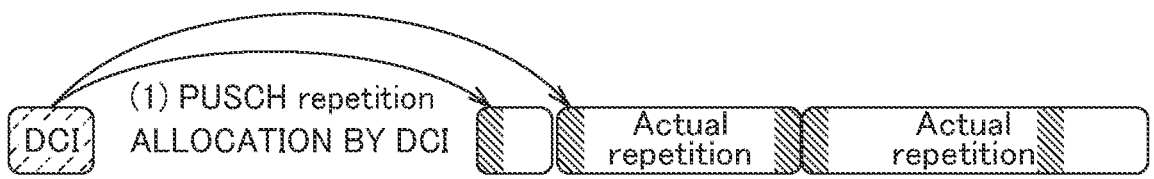
FIG. 7 is a conceptual diagram of DMRS bundling between PUSCH replications of a plurality of slots according to the first operation example.

FIG. 7 is a conceptual diagram of DMRS bundling between PUSCH replications of a plurality of slots according to the first operation example. As shown in FIG. 7, the cross channel estimation in a plurality of PUSCH repetitions assigned during the PUSCH repetition may be applied.

In the PUSCH repetition, a PUSCH can be allocated across a plurality of slots. In this case, the UE 200 may be instructed to transmit the DMRS so that the channel estimation can be performed using the DMRS of the plurality of slots.

The UE 200 may be notified of the number of repetitions to which DMRS bundling is applied in addition to (i), (iii), and (iv) described above.

The notification may be implemented by DCI or higher layer signaling as described above.

In the case of DCI, the information described above may be notified to the UE 200, for example, that DMRS bundling is applied between PUSCH repetitions.

Alternatively, an element indicating the applicability of DMRS bundling may be added to the PUSCH-Allocation of the PUSCH-TimeDomainResourceAllocation IE, and the index to which DMRS bundling is applied may be specified by the TDPA of the DCI. In this case, the above-described information may be configured or notified in advance by the specification of the 3GPP or by the signaling of the higher layer.

In the case of higher layer signaling, the above information such as whether or not DMRS bundling is applicable between PUSCH repetitions may be notified. For example, PUSCH config may be used to notify whether DMRS bundling is applied between repetitions. In this case, the above information regarding the application of DMRS bundling between PUSCH repetitions may be configured or notified in advance by the 3GPP specifications or by the signaling of the higher layer.

The slot to which the cross-slot channel estimation is applied may be explicitly or implicitly indicated to the UE 200.

Figure 8:
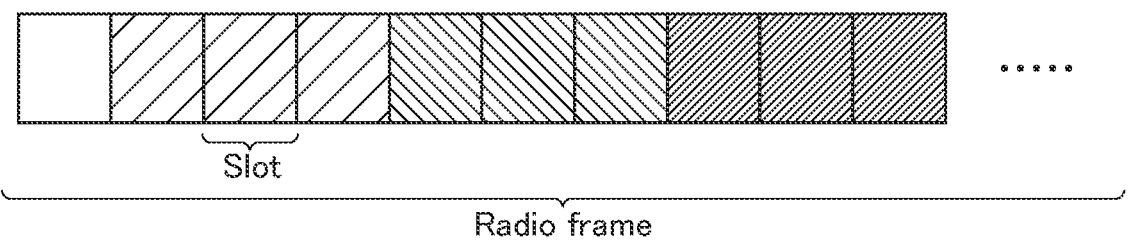
FIG. 8 is a diagram showing an example of allocation of application slots of the cross-slot channel estimation according to the operation example 1.

FIG. 8 shows an example of allocation of application slots of the cross-slot channel estimation according to the operation example 1. FIG. 8 shows whether DMRS bundling is applied to the slots shown by the same hatching pattern.

When the UE 200 transmits the PUSCH in the designated slot group, it may transmit the DMRS so that the DMRS bundling can be applied.

The indication may also be implemented by DCI or higher layer signaling as described above.

In the case of DCI, the number of slots after the slot (of the radio resource) for which the UL grant was made may indicate whether DMRS bundling is applied. In addition, the number of slots before the slot in which the UL grant is made may indicate whether or not DMRS bundling is applied. These instructions may be combined (In other words, the number of front and rear slots relative to the slot may be indicated).

In the case of higher layer signaling, slot periodicity and slot offset may be used to indicate which slot group is capable of DMRS bundling.

For example, in the case of DMRS-UplinkConfig IE DMRSBundlingStartSlotOffset3 (DMRS bundling applicable slot group period is 3 slots), a parameter may be added to specify the first slot of the radio frame in which the slot group is located.

The arrangement (assignment pattern) in the DMRS to the slot (symbol) may follow at least one of the following options (Opt).

(Opt1): Use Separate DMRS Configurations

A DMRS may be placed in a DMRS symbol placed in each PUSCH prior to PUSCH integration.

(Opt2): DMRS Aligned with the Radio Resources to which the Cross Slot Channel Estimation Applies In a radio resource to which DMRS bundling is applied, DMRS may be evenly spaced.

In addition, both Opt1 and Opt2 may be supported, and it may be notified which signaling of a lower layer (such as DCI) or a higher layer is used.

Figure 9:
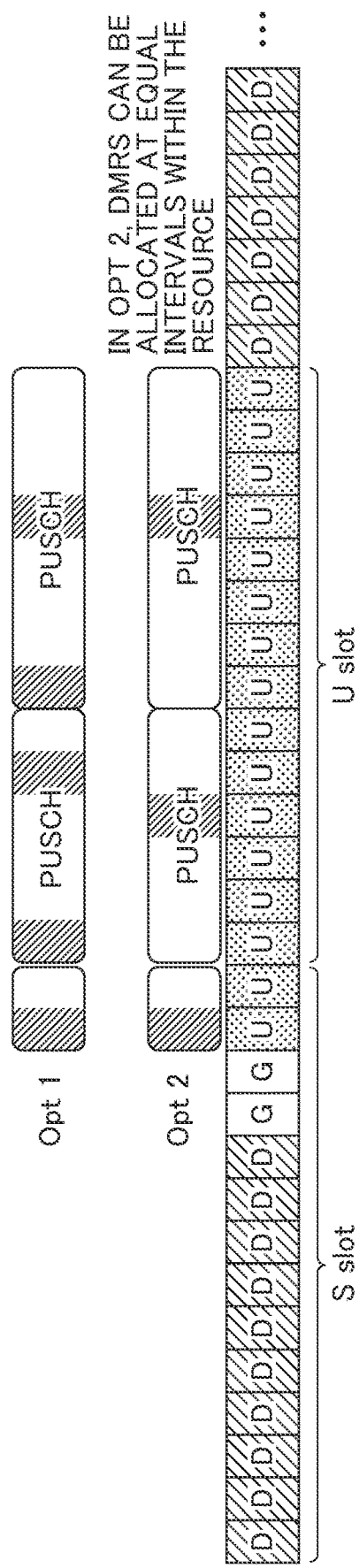
FIG. 9 is a diagram showing an example of DMRS arrangement when DMRS bundling is applied according to operation example 1.

FIG. 9 shows an example of DMRS arrangement when DMRS bundling is applied according to operation example 1. Specifically, FIG. 9 shows the arrangement (allocation pattern) of the DMRS according to the above-mentioned Opt1 and Opt2. As shown in FIG. 9, in Opt2, the DMRS may be arranged at equal intervals in the time direction.

In Opt2, the arrangement of the DMRS position corresponding to the total number of symbols to which the cross slot channel estimation is applied may be used.

Specifically, if the total number of symbols is 14 or less, when applying DMRS bundling, the DMRS position corresponding to the total number of symbols may be applied as it is.

Figure 10:
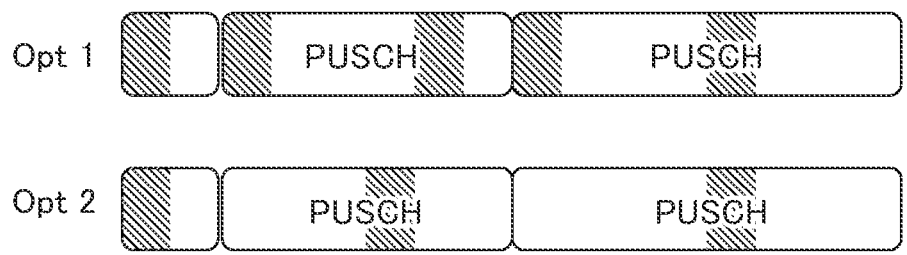
FIG. 10 is a diagram showing the arrangement (allocation pattern) of PUSCH and DMRS related to Opt1 and Opt2 shown in FIG. 9.

FIG. 10 shows the arrangement (allocation pattern) of PUSCH and DMRS related to Opt1 and Opt2 shown in FIG. 9.

If the total number of symbols is 15 or more, the DMRS position in the DMRS configuration type may be extended to accommodate 15 or more symbols when applying DMRS bundling.

Alternatively, if the existing PUSCH DMRS position is, for example, a total of 16 symbols that may be repetitioned in the time direction, and the PUSCH is repeatedly transmitted, two repetitions of the 8 symbol PUSCH DMRS position, or the 14 symbol PUSCH and the 2 symbol PUSCH DMRS position may be placed.

Also, as the symbol length increases, the number of dmrs-AdditionalPosition of the RRC layer may be increased.

For example, the number of additional DMRS may be configured to be larger than the existing number, such as ENUMERATED {pos 0, pos 1, pos 3, pos 5, pos 8, pos 10} for the dmrs-AdditionalPosition of the DMRS-UplinkConfig IE.

(3.3.2) Operation Example 2

Figure 11:
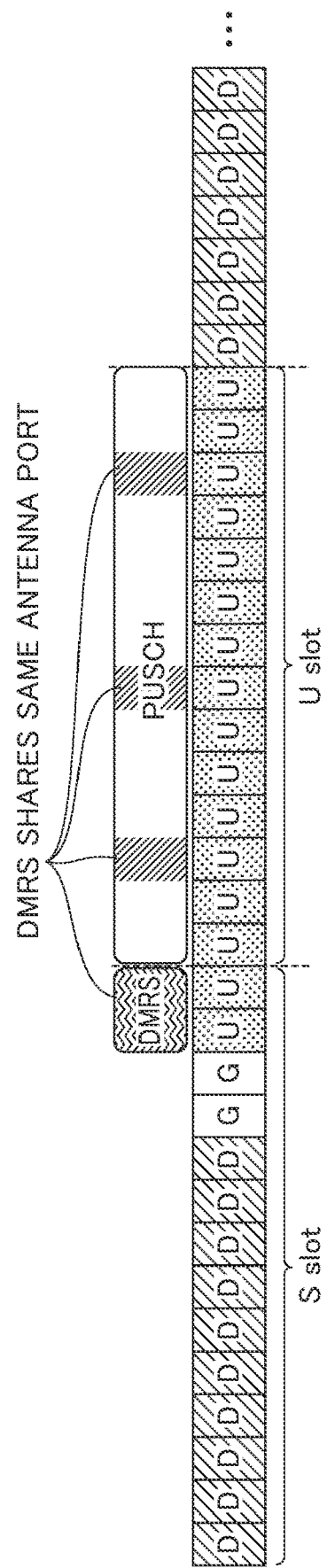
FIG. 11 is a diagram showing an example of allocation of DMRS and PUSCH according to operation example 2.

In this operation example, only the DMRS is transmitted in the specific slot (S slot). FIG. 11 shows an example of allocation of DMRS and PUSCH according to operation example 2. Such an allocation example of DMRS corresponds to Opt2 (Place the DMRS of the same antenna port as the PUSCH transmitted in the slot following the UL symbol in the S slot.) of the operation example 1 shown in FIG. 5.

That is, the DMRS transmitted in the S slot may be used for channel estimation of the PUSCH of the next slot (U slot).

In this case, since only the DMRS without a data signal is transmitted in the resource mapping of the DMRS, a DMRS of 1 comb may be arranged.

At the time of UL grant, the UE 200 may be instructed to transmit DMRS in the S slot. Specifically, the DCI may instruct the transmission of DMRS in the S-slot, or the DMRS may be transmitted when the condition is satisfied by the signaling of the higher layer. The number of symbols in the DMRS may be variable.

Figure 12:
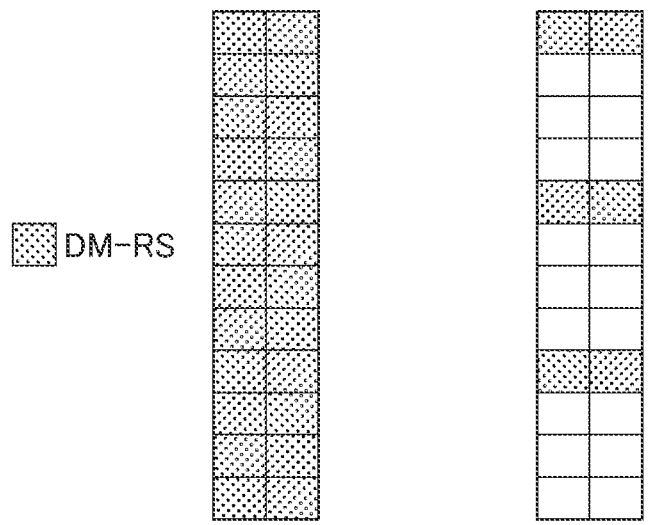
FIG. 12 is a diagram showing a configuration example of the DMRS according to the operation example 2.

FIG. 12 shows a configuration example of the DMRS according to the operation example 2. Specifically, the vertical direction in FIG. 12 corresponds to the frequency direction, and the horizontal direction corresponds to the time direction. The DMRS shown in FIG. 12 has a 1 comb configuration.

The transmission power of the PUSCH varies depending on the data to be transmitted and whether or not frequency division multiplexing (FDM) is used in the DMRS. In order to apply DMRS bundling, the transmission power must be equal, but when only DMRS is being transmitted, since FDM is not used, the transmission power of PUSCH and DMRS may be changed.

The use of 1 comb DMRS has the advantage of improving DMRS density, avoiding DMRS power boosting, and matching DMRS power between slots. Thus, by transmitting only the DMRS in the S slot, radio resources can be maximally utilized.

Figure 13:
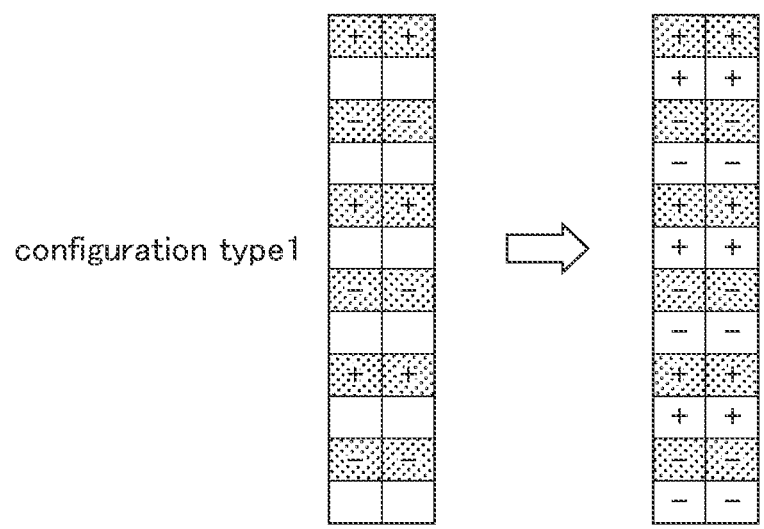
FIG. 13 is a diagram showing the type (Type 1) of the DMRS according to the operation example 2.
Figure 14:
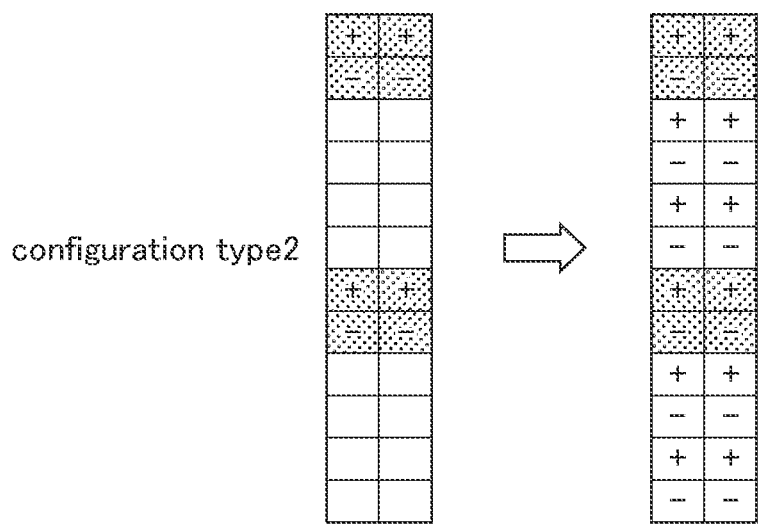
FIG. 14 is a diagram showing the type (Type 2) of the DMRS according to the operation example 2.

FIGS. 13 and 14 show the type (Type) of the DMRS according to the operation example 2. Specifically, FIG. 13 shows DMRS configuration type 1, and FIG. 14 shows DMRS configuration type 2.

More specifically, FIGS. 13 and 14 show an example of a resource mapping of a DMRS port.

Type 1 and Type 2 are so-called front-loaded DMRSs in which the sequence of DMRSs is placed at the forward symbol in the slot. In Type 1 and Type 2, sequences are multiplexed in a spatial direction, specifically using a plurality of ports. The port may be a port of the gNB, specifically an antenna port.

As shown in FIGS. 13 and 14, the 1 comb configuration may be flexibly arranged according to the number of PUSCH DMRS ports.

For example, when the DMRS to be inserted is one or two symbols, the 1-comb configuration may be used only when the number of DMRS ports is two or four or less, respectively.

When the DMRS is inserted, the number of corresponding ports may be increased by changing the DMRS ports assigned to each symbol. Furthermore, when the DMRS is inserted, orthogonality between the DMRS may be ensured by changing the DMRS port assigned to each symbol.

If the 1-comb configuration is not used, the same resource mapping may be applied to the PUSCH DMRS port of the next slot. On the other hand, when a 1-comb configuration is used, the same resource mapping may be repeated twice in the frequency direction in the DMRS configuration type 1, and the same resource mapping may be repeated three times in the frequency direction in the DMRS configuration type 2.

Figure 15:
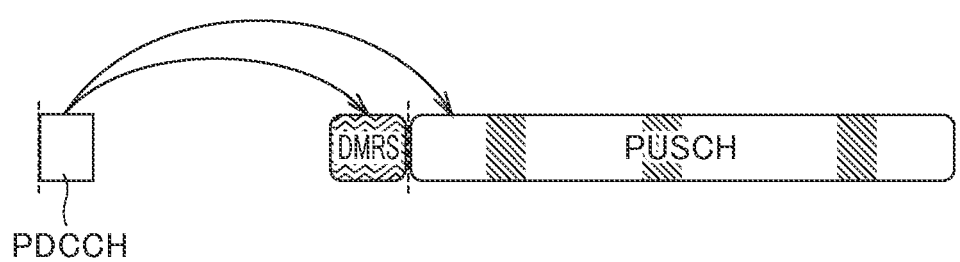
FIG. 15 is a diagram showing an example of scheduling PDCCH, DMRS and PUSCH according to operation example 2.

FIG. 15 shows an example of scheduling PDCCH, DMRS and PUSCH according to operation example 2. As described above, as a method for notifying the UE 200 of the transmission of only the DMRS, it is possible to instruct the insertion of the DMRS in the S slot at the time of the UL grant.

Specifically, the DMRS may be inserted using the new DCI format, or the number of symbols in the DMRS and the use of a 1-comb configuration may be notified. Alternatively, it may be notified by the TDRA of an existing DCI. For example, a flag may be added to PUSCH-Allocation in the PUSCH-TimeDomainResourceAllocation information element of the RRC layer to indicate whether or not to insert the DMRS.

In the case of higher layer signaling, the insertion of the DMRS, the number of symbols in the DMRS, and the use of the 1 comb configuration are notified, and the UE 200 may transmit the UE 200 if the conditions are satisfied. For example, the DMRS parameters may be configured using the DMRS-UplinkConfig IE of the RRC layer.

The DMRS transmission conditions may be configured or informed by 3GPP specifications or higher layer signaling. For example, if PUSCH is assigned to 14 symbols in the next U slot, DMRS may be inserted in the S slot.

Further, the setting of the DMRS config may be notified by the signaling of the higher layer, and the DCI may notify the DMRS insertion.

(3.3.3) Operation Example 3

In this operation example, the channel estimation of the PUCCH is executed using the DMRS across the slots (PUCCH Cross-slot channel estimation).

Figure 16:
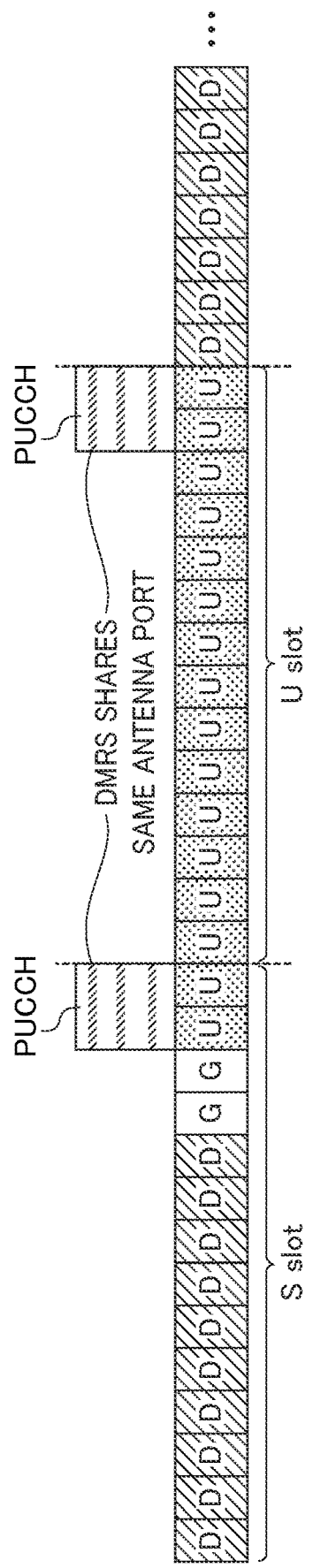
FIG. 16 is a diagram showing an example of allocation of DMRS and PUCCH according to operation example 3.

FIG. 16 shows an example of allocation of DMRS and PUCCH according to operation example 3. In this operation example, the higher layer signaling may notify the slot group of the same port to which DMRS bundling is applied.

In addition, it may be notified whether or not DMRS bundling is applied to the PUCCH that has been repeatedly transmitted. Specifically, it may be notified whether DMRS bundling is applicable to all or a plurality of repetitioned PUCCHs. For example, using PUCCH-FormatConfig in the PUCCH-Config information element, norepDMRSBundling may be added (If norepDMRSBundling=4, DMRS bundling can be applied every 4 actual repetitions) as a parameter to notify PUCCH capable of DMRS bundling.

The application of DMRS bundling in a particular slot may also be notified. Specifically, the group of slots to which DMRS bundling is applicable may be configured using slot periodicity and slot offset (see FIG. 15), and the DCI to which the PUCCH resource is allocated may notify how many slots before and after the PUCCH DMRS bundling is applied.

It should be noted that any or all of the above-described notification methods may be applied.

(3.3.4) Example 4

The UE 200 may report the following to the network as UE Capability Information for the cross-slot channel estimation: The object may be PUSCH and PUCCH collectively or individually.
  PUSCH Cross-slot channel estimation Applicability
    Applicability of Cross-slot channel estimation using Multi-PUSCH allocation
    Applicability of Cross-slot Channel Estimation Using PUSCH Repetition
    Applicability of the PUSCH cross-slot channel estimation in the specified slot
    Applicability of the new DMRS position
    Applicability of DMRS insertion
    Applicability of 1comb DMRS
    Cross-slot channel estimation Maximum number of applicable symbols
  PUCCH Cross-slot channel estimation Applicability
    Applicability of Cross-slot Channel Estimation Using PUCCH Repetition
    Applicability of the PUSCH cross-slot channel estimation in the specified slot
    Cross-slot channel estimation Maximum number of applicable symbols The UE 200 may report the corresponding (supported) frequency (which may be FR or band) in any of the following ways:
  Availability for all frequencies (availability as a mobile station)
  Availability for each frequency
  Availability of each FR1/FR2
  Availability of each SCS The UE 200 may report the corresponding duplex mode by any of the following methods.
  Availability as UE
  Applicability for each duplex mode (TDD/FDD)

(4) OPERATIONAL EFFECTS

According to the embodiment described above, the following effects are obtained. Specifically, the gNB 100 can perform channel estimation of an uplink channel (PUSCH or PUCCH) allocated across a plurality of consecutive slots by using the DMRS allocated to the plurality of slots. The UE 200 can also transmit capability information related to the channel estimation of the uplink channel using the DMRS.

Therefore, the accuracy of the channel estimation can be improved, and as a result, radio resources can be more effectively utilized. That is, according to the gNB 100 and the UE 200, the radio resources related to the uplink channel can be more efficiently utilized while improving the coverage performance.

In this embodiment, channel estimation of a PUSCH allocated across a plurality of slots or a PUSCH allocated across a plurality of slots by repetition of the PUSCH can be executed. Therefore, flexible channel estimation can be performed according to the setting state of the PUSCH.

In this embodiment, slot information indicating a slot to be subjected to channel estimation is transmitted to the UE 200. Thus, UE 200 may apply appropriate settings that can perform channel estimation of uplink channels allocated across slots.

In this embodiment, it can be assumed that the gNB 100 transmits only the DMRS in the symbol included in the first slot (S slot) among the plurality of slots. Thus, more efficient transmission of DMRS can be realized.

(5) OTHER EMBODIMENTS

Although the embodiment has been described above, it is obvious to those skilled in the art that various modifications and improvements are possible without being limited to the description of the embodiment.

For example, in the above embodiment, the demodulation reference signal (DMRS) used for channel estimation of PUSCH (or PUCCH) has been described, but a reference signal used for channel estimation of a physical channel such as PUSCH (or PUCCH) may be another reference signal.

Although the DMRS bundling between PUSCHs having a plurality of slots has been described in the above embodiment, the DMRS bundling described above may be applied between the DMRS for PUSCH and the DMRS for PUCCH.

A block diagram (FIG. 3) used in the description of the above-described embodiment shows a block for each function unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that functions the transmission is called a transmission unit (transmitting unit) or a transmitter. As described above, there is no particular limitation on the method of implementation.

Figure 17:
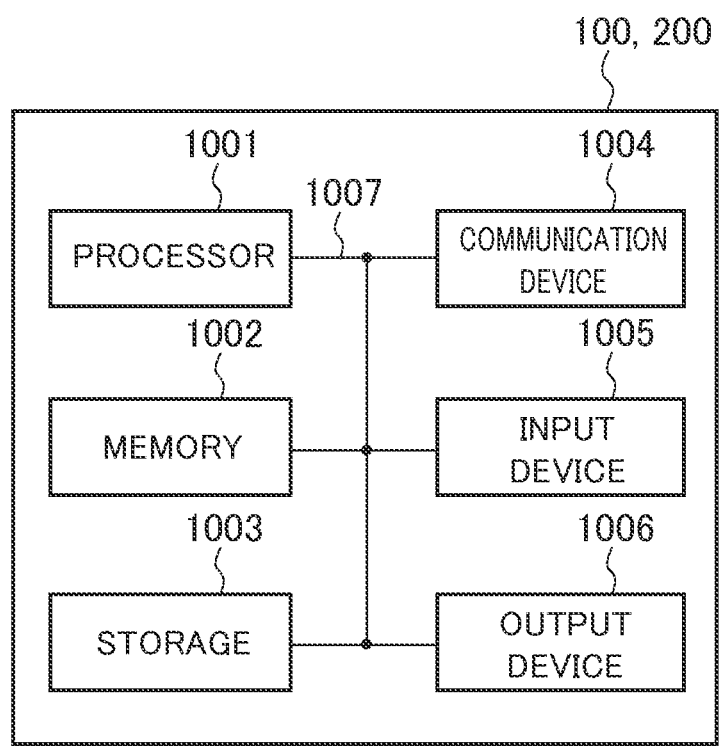
FIG. 17 is a diagram showing an example of a hardware configuration of the gNB 100 and the UE 200.

Further, the above-mentioned gNB 100 and UE 200 (the apparatus) may function as a computer that performs processing of the radio communication method of the present disclosure. FIG. 17 is a diagram showing an example of a hardware configuration of the apparatus. As shown in FIG. 17, the device may be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

Each functional block of the device (see FIG. 3) is realized by any hardware element of the computer device or a combination of the hardware elements.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

The processor 1001 operates, for example, an operating system to control the entire computer. Processor 1001 may comprise a central processing unit (CPU) including interfaces to peripheral devices, controllers, arithmetic units, registers, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. Memory 1002 may be referred to as a register, cache, main memory, or the like.

The memory 1002 may store programs (program codes), software modules, and the like that are capable of executing the method according to one embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Devices such as the processor 1001 and the memory 1002 are connected by a bus 1007 for communicating information. The bus 1007 may be configured using a single bus or may be configured using different buses for each device.

In addition, the device may comprise hardware such as a microprocessor, a digital signal processor (DSP), an application specific integrated circuit (ASIC), a programmable logic device (PLD), a field programmable gate array (FPGA), and the hardware may implement some or all of each functional block. For example, the processor 1001 may be implemented by using at least one of these hardware.

Further, the notification of the information is not limited to the mode/embodiment described in the present disclosure, and other methods may be used. For example, notification of information may be performed by physical layer signaling (e.g., Downlink Control Information (DCI), Uplink Control Information (UCI), higher layer signaling (e.g., RRC signaling, Medium Access Control (MAC) signaling, broadcast information (Master Information Block (MIB), System Information Block (SIB)), other signals, or a combination thereof. The RRC signaling may also be referred to as an RRC message, for example, an RRC Connection Setup message, an RRC Connection Reconfiguration message, and the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, and the like of each aspect/embodiment described in the present disclosure may be changed in order as long as there is no contradiction. For example, the methods described in this disclosure use an exemplary sequence to present the elements of the various steps and are not limited to the particular sequence presented.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from a higher layer (or lower layer) to a lower layer (or higher layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each of the aspects/embodiments described in the present disclosure may be used alone, in combination, or switched over in accordance with implementation. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of the channel and the symbol may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile body may be a vehicle (For example, cars, planes, etc.), an unmanned mobile body (Drones, self-driving cars, etc.), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal). For example, each aspect/embodiment of the present disclosure may be applied to a configuration in which communication between a base station and a mobile station is replaced with communication between a plurality of mobile stations (For example, it may be called Device-to-Device (D2D), Vehicle-to-Everything (V2X), etc.). In this case, the mobile station may have the function of the base station. In addition, words such as "up" and "down" may be replaced with words corresponding to communication between terminals (For example, "side"). For example, terms an uplink channel, a downlink channel, or the like may be read as a side channel.

Similarly, the mobile station in the present disclosure may be read as a base station. In this case, the base station may have the function of the mobile station. A radio frame may be composed of one or more frames in the time domain. Each frame or frames in the time domain may be referred to as a subframe. A subframe may be further configured by one or more slots in the time domain. The subframe may be a fixed time length (For example, 1 ms) independent of the numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in time units greater than the minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one of the sub-frame and TTI may be a sub-frame (1 ms) in the existing LTE, a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. The number of slots (minislot number) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB based on the common reference point of the carrier. PRB may be defined in BWP and numbered within that BWP.

BWP may include UL BWP (UL BWP) and DL BWP (DL BWP). One or a plurality of BWPs may be set in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each apparatus may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining" and "determining" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" or "decision" may include regarding some action as "judgment" or "decision". Moreover, "judgment (decision)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS 10 radio communication system
20 NG-RAN
100 gNB
110 radio signal transmission and reception unit
120 amplifier unit
130 modulation and demodulation unit
140 control signal and reference signal processing unit
150 encoding/decoding unit
160 data transmission and reception unit 170 control unit
200 UE
1001 processor
1002 memory
1003 storage
1004 communication device
1005 input device
1006 output device
1007 bus

The invention claimed is:

1. A terminal comprising:
a processor that controls bundling of a demodulation reference signal allocated to a plurality of consecutive slots; and
a transmitter that transmits an uplink channel using the plurality of consecutive slots by repeating the uplink channel, wherein
the processor determines a number of slots to which the bundling applies when the bundling is applied, based on a maximum number of slots to which the bundling applies, the maximum number of slots being configured by higher layer signaling.

2. The terminal of claim 1, wherein the processor applies the bundling based on a higher layer signaling.

3. A radio base station comprising:
a receiver that receives an uplink channel using a plurality of consecutive slots by repeating the uplink channel;
a processor that controls bundling of a demodulation reference signal allocated to a plurality of consecutive slots; and
a transmitter that transmits notification on a maximum number of slots to which the bundling applies for a terminal to configure a number of slots to which the bundling applies when the bundling is applied.

4. A radio communication system including a terminal and a radio base station, wherein
the terminal comprises:
a processor that controls bundling of a demodulation reference signal allocated to a plurality of consecutive slots; and
a transmitter that transmits an uplink channel using the plurality of consecutive slots by repeating the uplink channel, wherein
the processor determines a number of slots to which the bundling applies when the bundling is applied, based on a maximum number of slots to which the bundling applies, the maximum number of slots being configured by higher layer signaling, and
the radio base station comprises:
a receiver that receives an uplink channel using a plurality of consecutive slots by repeating the uplink channel;
a processor that controls bundling of a demodulation reference signal allocated to a plurality of consecutive slots; and
a transmitter that transmits notification on the maximum number of slots to which the bundling applies for the terminal.

5. A radio communication method of a terminal comprising the steps of:
controlling bundling of a demodulation reference signal allocated to a plurality of consecutive slots; and
transmitting an uplink channel using the plurality of consecutive slots by repeating the uplink channel, wherein
in the controlling step, a number of slots to which the bundling applies is determined when the bundling is applied, based on a maximum number of slots to which the bundling applies, the maximum number of slots being configured by higher layer signaling.

* * * * *